(12) United States Patent
Webb et al.

(10) Patent No.: US 9,508,055 B1
(45) Date of Patent: Nov. 29, 2016

(54) METHOD AND SYSTEM FOR MANAGING AND RESPONDING TO LEGAL HOLD NOTICES

(75) Inventors: Paul Anthony Webb, San Jose, CA (US); Pavithra Selvaraj, Sunnyvale, CA (US); Aaron Baird Webber, San Francisco, CA (US); Manish Sampat, Union City, CA (US)

(73) Assignee: Veritas Technologies LLC, Mountain View, CA (US)

( * ) Notice: Subject to any disclaimer, the term of this patent is extended or adjusted under 35 U.S.C. 154(b) by 1137 days.

(21) Appl. No.: 13/403,860

(22) Filed: Feb. 23, 2012

(51) Int. Cl.
| | |
|---|---|
| *G06F 15/16* | (2006.01) |
| *G06Q 10/10* | (2012.01) |
| *G06Q 30/06* | (2012.01) |

(52) U.S. Cl.
CPC .......... *G06Q 10/10* (2013.01); *G06Q 30/0625* (2013.01)

(58) Field of Classification Search
CPC ...... G06Q 10/10; G06Q 50/18; G06Q 10/00; G06Q 30/02; G06Q 30/0641; G06Q 30/0625
USPC ................................................ 709/204–207
See application file for complete search history.

(56) References Cited

U.S. PATENT DOCUMENTS

| | | | | |
|---|---|---|---|---|
| 2005/0251456 | A1* | 11/2005 | Perkowski | ...................... 705/26 |
| 2007/0271517 | A1* | 11/2007 | Finkelman et al. | .......... 715/742 |
| 2008/0109306 | A1* | 5/2008 | Maigret | .................. G06F 21/10 705/14.46 |
| 2009/0030774 | A1* | 1/2009 | Rothschild | ............. G06Q 30/02 705/14.1 |
| 2012/0016943 | A1* | 1/2012 | Greenberg | ............. G06Q 10/06 709/206 |
| 2013/0041942 | A1* | 2/2013 | Oh et al. | ....................... 709/203 |

\* cited by examiner

*Primary Examiner* — Joseph Greene
(74) *Attorney, Agent, or Firm* — Wilmer Cutler Pickering Hale and Dorr LLP (57) ABSTRACT

A secure administration server sends legal hold information to a confirmation server in response to a delivery request. The legal hold information comprises a plurality of recipients required to comply with a legal hold notice. The secure administration server generates a unique email for each of the plurality of recipients. Each unique email comprises a unique Uniform Resource Locator (URL) to the confirmation server for a corresponding recipient. The secure administration server obtains a confirmation of compliance associated with the corresponding recipient from the confirmation server.

17 Claims, 8 Drawing Sheets

METHOD AND SYSTEM FOR MANAGING AND RESPONDING TO LEGAL HOLD NOTICES

TECHNICAL FIELD

Embodiments of the present invention relate to data management, and more particularly, to a technique of managing and responding to legal hold notices.

BACKGROUND

A legal hold is a process which an organization uses to preserve all forms of relevant information when litigation is reasonably anticipated. The legal hold is generally initiated by notice or communication from legal counsel to an organization and causes a suspension of the normal disposition or processing of records. An administrator, such as an information technology (IT) administrator, may identify custodians and mailboxes to hold in response to a legal hold notice. A custodian is a person or entity that owns or controls access to a set of electronic documents. A custodian can be any person who has read and write access to electronically stored information (ESI) during the course of normal operational activity. The administrator should notify custodians of the legal hold and disseminate the legal hold notice to the custodians as quickly as possible. In addition, the administrator needs to keep track of the custodians that have responded to the legal hold notice.

Moreover, the legal hold notice process should be defensible and auditable. In order for the legal hold notice process to be defensible and auditable, an organization should be able to show that it complied with and distributed the legal hold notice to all custodians. If the organization cannot show compliance, legal sanctions can ensure, such as fines or losing the litigation in court. However, the information involved in the legal hold notice process, and usually all e-discovery information, generally includes sensitive and/or confidential data. This information must be secured and kept confidential. Therefore, although an organization may be required to show compliance with the legal hold notice, the organization does not want to disseminate any of the sensitive or confidential information involved in the legal hold.

Currently, most organizations have a manual notification and tracking process (such as Excel spreadsheets), with one or more people (such as the administrator) sending the legal hold notice, keeping track of who has been sent the legal hold notice, and keeping track of who has responded to the legal hold notice. This manual process may be sufficient if there are few custodians to notify. However, it is not scalable, such as when a legal hold notice involves a large number (e.g., thousands) of custodians. It is very difficult and/or tedious to manage the manual process, and mistakes may be made. Moreover, the manual process is very difficult to audit or defend.

Another current approach is to use a single system that creates an electronic message, sends it to the appropriate recipients, and tracks their responses. However, this system may not be able track whether the notices were received. The use of email receipts can be used, but there is no guarantee that a recipient will send back an email receipt. Furthermore, if a response beyond a simple acknowledgement is required (e.g., answers to questions regarding the legal hold notice), an email receipt will not allow a recipient to provide this type of response. Another option is to ask the recipient to respond to the administrator that they received the notice. This is infeasible if the administrator has to keep track of thousands of messages from thousands of recipients.

Another option is to provide a web server for a recipient to respond to the legal hold notice. The web server can allow for tracking of messages and provide real-time updates with the responses of the recipients. However, use of a web server would introduce security issues, as every recipient (e.g., thousands of recipients) would have access to the web server, which contains sensitive or confidential information. Furthermore, the web server could be used for other purposes and may not have enough computational resources to handle the legal hold notice process.

SUMMARY

An exemplary system may include a secure administration server including a memory and a processing device that is coupled to a memory. In one embodiment, the secure administration server sends legal hold information to a confirmation server in response to a delivery request. The legal hold information comprises a plurality of recipients required to comply with a legal hold notice. The secure administration server generates a unique email for each of the plurality of recipients required to comply with the legal hold notice. Each unique email comprises a unique Uniform Resource Locator (URL) to the confirmation server for a corresponding recipient. The secure administration server obtains a confirmation of compliance associated with the corresponding recipient from the confirmation server.

In one embodiment, the secure administration server is a secure server and the confirmation server is an insecure server. In one embodiment, the confirmation server stores each confirmation received from one or more recipients in a staging area of the confirmation server. In one embodiment, the secure administration server obtains the confirmation of compliance by determining whether a confirmation is stored in the staging area of the confirmation server at a predefined time and sending a request to the confirmation server upon determining that the confirmation is stored in the staging area of the confirmation server.

In one embodiment, the secure administration server generates secure information for the legal hold notice based on the obtained confirmation. In one embodiment, the secure administration server generates a release for the legal hold notice, the release comprising a release email for each of the plurality of recipients.

In one embodiment, the unique URL for each recipient comprises a unique message identifier for the recipient and a hold notice identifier. The hold notice identifier identifies the legal hold notice associated with the URL.

In one embodiment, the confirmation server displays a webpage associated with the URL in response to receiving a request from a recipient to load the URL, wherein the webpage comprises each legal hold corresponding to the recipient. In one embodiment, the webpage comprises each legal hold corresponding to the recipient.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for managing and responding to legal hold notices.

An administrator in an organization may need to notify custodians, or recipients, of a legal hold that they are required to comply with and disseminate the legal hold notice to the recipients as quickly as possible. The recipients may currently be employed by the organization or may not be employed by the organization. The administrator may request delivery of the legal hold notice to a list of recipients required to comply with the legal hold notice. For example, the administrator may have a list of ten thousand recipients that are required to comply with the legal hold notice. The recipients that have received and responded to the legal hold notice should be tracked in order for the legal hold notice process to be legally defensible and auditable. Moreover, any sensitive and/or confidential information of the organization should be kept sensitive and/or confidential, and cannot be accessible to the recipients.

Managing and responding to legal hold notices can be implemented through the use of two servers, a secure administration server and a confirmation server. The secure administration server may be placed inside of a secure corporate firewall, where any data stored on the secure administration server may be secured from outside attacks and queries. The confirmation server can be placed outside of the firewall for external access.

The secure administration server may be used to send legal hold information, including the list of recipients, to the confirmation server over a secure connection in response to a delivery request by the administrator.

A unique email may be generated by the secure administration server, and sent to each recipient required to comply with the legal hold notice. The unique email may include a Uniform Resource Locator (URL) that, when clicked, takes the recipient to a webpage. The webpage may include information about the legal hold notice, as well as questions related to the legal hold notice. For example, the administrator may ask one or more of the recipients "Did you have any contact with the other party prior to Jan. 1, 2012?" Using the webpage, the recipient can answer the included questions, as well as confirm compliance with the legal hold notice.

Once the user has submitted a response, the secure administration server can automatically update secure information associated with the legal hold notice, such as which recipients have confirmed compliance with the legal hold notice, and any answers to questions submitted by the recipients.

Figure 1:
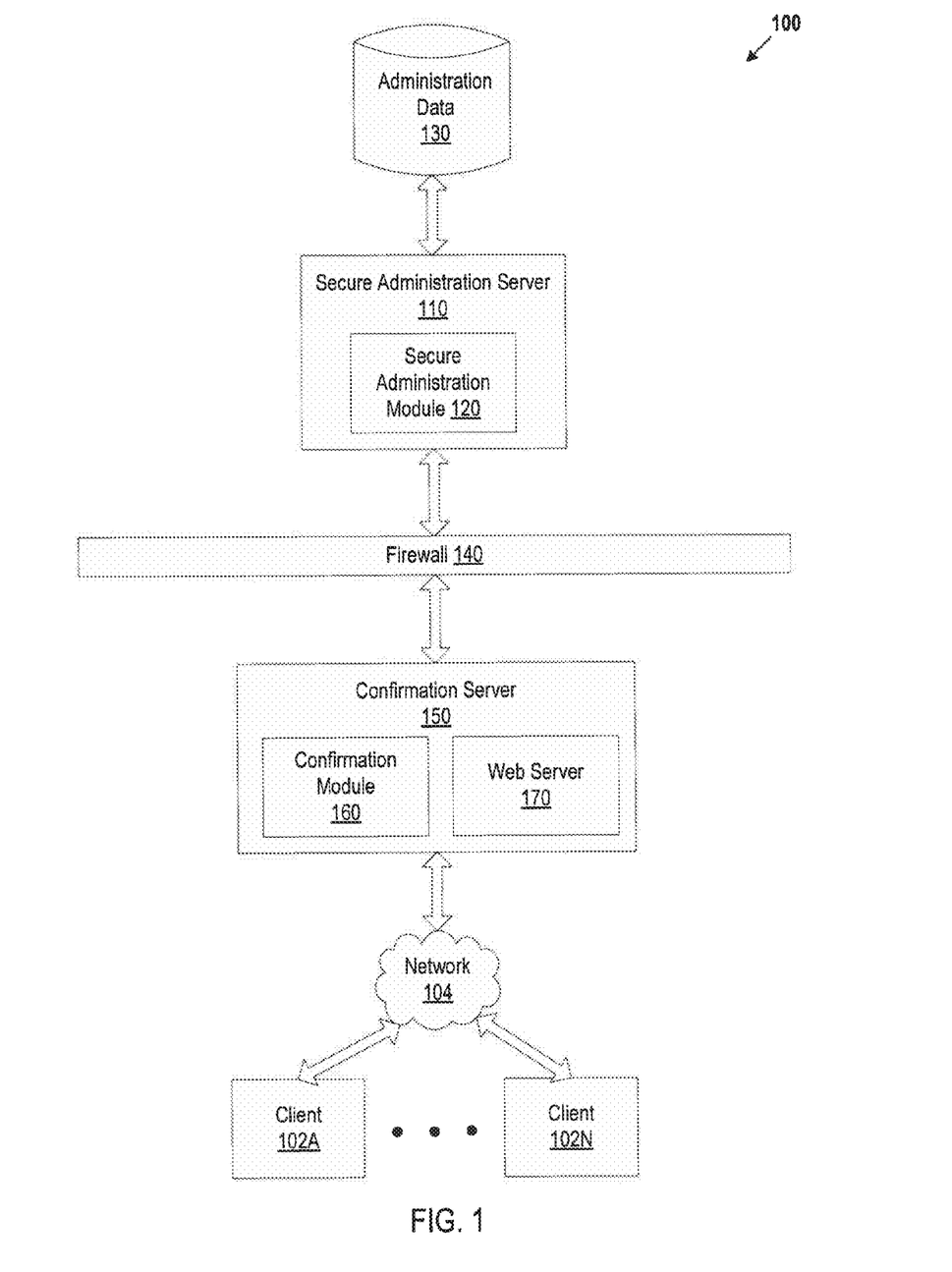
FIG. 1 illustrates exemplary system architecture, in accordance with various embodiments of the present invention.

FIG. 1 illustrates exemplary system architecture 100 in which embodiments can be implemented. The system architecture 100 includes a secure administration server 110, an administration data repository 130, a firewall 140, a confirmation server 150, and client machines 102A-102N connected to a network 104. Network 104 may be may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

Secure administration server 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the secure administration server 110 is deployed as a network appliance (e.g., a network router, hub, or managed switch).

Administration data repository 130 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, administration data repository 130 might be a network-attached file server, while in other embodiments administration data repository 130 might be some other type of persistent storage such as an object-oriented database, a relational database, and so forth.

The data in the administration data repository 130 can include data related to one or more legal hold notices. Examples of data related to one or more legal hold notices can include, and are not limited to, identification information for the legal hold notice (hold identifier), identification information for recipients of the legal hold notice (recipient identifier), email data including URLs and/or websites associated with the recipients of the legal hold notice, compliance information associated with the legal hold notice, questions associated with the legal hold notice, answers to questions associated with the legal hold notice, and any other electronically stored information that can be associated with a legal hold notice, etc.

Firewall 140 may be a device or set of devices designed to protect the secure administration server 110 and the administration data 130 from being accessed by one or more systems that are outside of the firewall. For example, firewall 140 may prevent the confirmation server 150 and the client machines 102A-102N from accessing the secure administration server 110 and/or the data in administration data 130.

Confirmation server 150 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the confirmation server 150 is deployed as a network appliance (e.g., a network router, hub, or managed switch).

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue information about a legal hold notice and/or questions related to the legal hold notice to the web server or may browse administration data that has previously been processed (e.g., questions, answers, information related to one or more legal hold notices, etc.). The client machines 102A-102N may also upload administration data to the secure administration server 110 for storage and/or classification (e.g., in administration data repository 130).

During operation of system 100, an administrator uses secure administration server 110 to request delivery of a legal hold notice to a group of recipients. The legal hold notice is sent to the recipients, who can access the legal hold notice via client device 102A-102N over network 104. The confirmation server 110 receives communications from the client device 102A-102N, and processes and/or directs these communications accordingly.

As discussed above, the secure administration server 110 can be a secure server, protected by firewall 140, such that unauthorized access by the confirmation server 150 and clients 102A-102N to secure administration server 110 and the data stored in administration data repository 130 is prevented. In one embodiment, secure administration server 110 includes a secure administration module 120. In one embodiment, the confirmation server 150 includes a confirmation module 160 and a web server 170. In alternative embodiments, the confirmation module 160 and the web server 170 run on different machines.

Secure administration module 120 can manage one or more legal hold notices. Upon receiving a delivery request (e.g., from an administrator of the secure administration server 110), the secure administration module 120 can send legal hold information to a confirmation server (e.g., confirmation server 150) in order to provide the confirmation server with a list of recipients (e.g., recipient identifiers) that need to be notified of a legal hold notice and contact information (e.g., email addresses) of the recipients. Confirmation module 160 can receive the legal hold information from the secure administration module 120.

In one embodiment, the confirmation module 160 sends an acknowledgement to the secure administration server once the legal hold information is received. In one embodiment, the secure administration module 120 receives an acknowledgement from the confirmation server in response to sending the legal hold information to the confirmation server.

The secure administration module 120 can generate and send a unique email for each recipient using a mail server (not shown, such as an SMTP server). The unique email for each recipient can include a unique URL for accessing a webpage for the recipient served by a web server (e.g., web server 170) in confirmation server 150.

The confirmation module 160 can provide data to web server 170 to display a webpage in response to receiving a request from a recipient to load a URL. In one embodiment, the URL is unique to the recipient, and is provided to the recipient by the secure administration module 120. In one embodiment, the confirmation module 160 determines whether the URL is valid.

Web server 170 may serve data from administration data 130 to client machines 102A-102N in response to receiving data from the confirmation module 160. The data served by web server 170 can include hold information for a legal hold notice identified in the URL. The data served by web server 170 can be used to generate a webpage by a data server (not shown) or by a web browser on client machines 102A-102N. The displayed webpage may be a webpage that is specific to the recipient, and may include survey questions for the recipient. Web server 170 may receive data from the recipient using one of client machines 102A-102N, such as a confirmation of compliance for the recipient. The data received by web server 170 may further include answers. The answers may be answers submitted by the recipient of the legal hold notice, and may be answers to questions presented on the webpage. Web server 170 may provide the data to confirmation module 160.

The confirmation module 160 may receive a confirmation of compliance from a recipient of hold information. The confirmation module 160 may also receive other information from a recipient, such as answers to questions submitted by the recipient. In one embodiment, confirmation module 160 can store the confirmation of compliance and other information in a staging area (not shown) of the confirmation server 150. Upon receiving a request from the secure administration server 110 for the confirmation of compliance and other information, the confirmation module 160 can send the confirmation of compliance and other information to the secure administration server 150.

Secure administration module 120 can obtain a confirmation of compliance associated with a recipient from the confirmation server. In one embodiment, the confirmation of compliance comprises answers to questions submitted by the recipient. The secure administration module 120 can generate secure administration data from the confirmation of compliance. The secure administration module 120 can store the confirmation of compliance and generated secure administration data in administration data repository 130.

Figure 2:
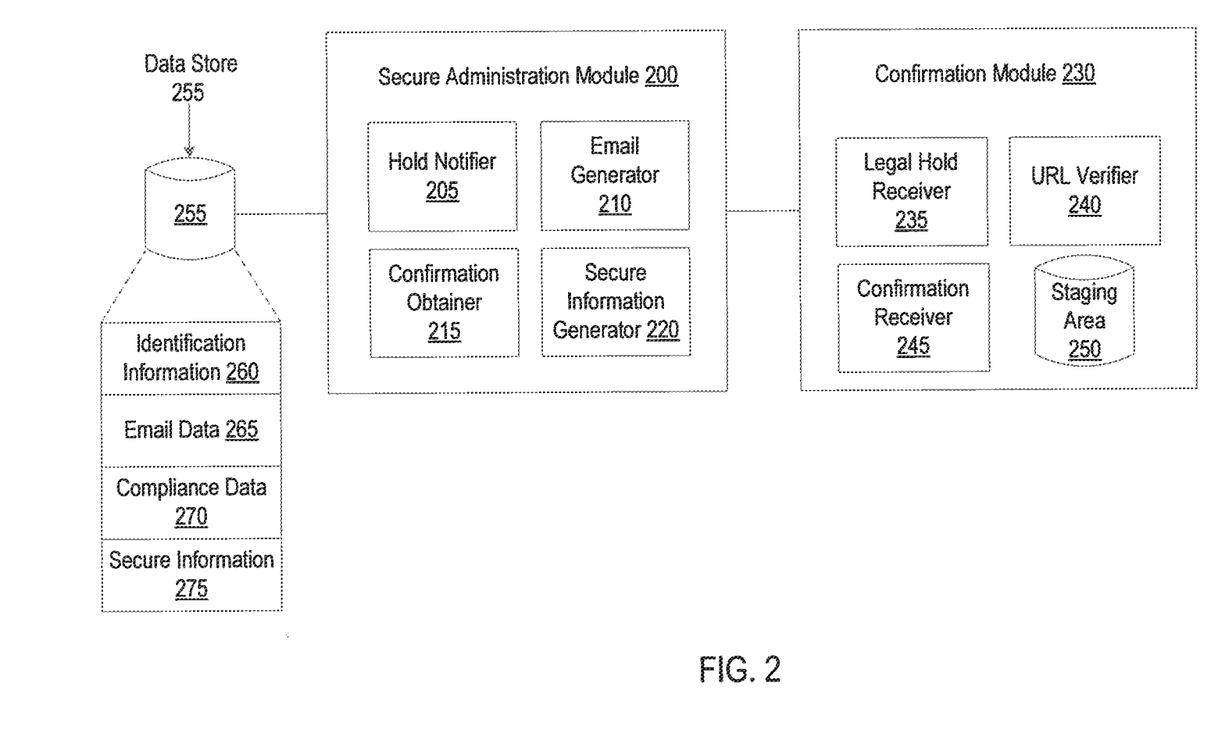
FIG. 2 is a block diagram of a confirmation module and a secure administration module, in accordance with an embodiment.

FIG. 2 is a block diagram of a secure administration module 200 and a confirmation module 230, in accordance with one embodiment of the present invention. The secure administration module 200 includes a hold notifier 205, an email generator 210, a confirmation obtainer 215, and a secure information generator 220. The confirmation module 230 includes a legal hold receiver 235, a URL verifier 240, a confirmation receiver 245, and a staging area 250. Note that in alternative embodiments, the functionality of one or more of the hold notifier 205, the email generator 210, the confirmation obtainer 215, and the secure information generator 220 may be combined or divided. Note that in alternative embodiments, the functionality of one or more of the legal hold receiver 235, the URL verifier 240, the confirmation receiver 245, and the staging area 250 may be combined or divided.

The hold notifier 205 can send legal hold information to the confirmation module 230 upon receiving a delivery request from an administrator that would like to distribute a legal hold notice. The legal hold information can include the minimum amount of information in order to allow a recipient to respond to the legal hold notice. For example, the legal hold information can include an identifier of the legal hold notice and an identifier (e.g., email address, name, etc.) for each recipient required to comply with the legal hold notice. The hold notifier 205 can obtain the legal hold information from data store 250. In one embodiment, the hold notifier 205 obtains identification information 260 to send to the confirmation module 230. Identification information 260 can include a list of recipients that need to be notified of a legal hold notice. In some embodiments, identification information 260 can further include an identifier of the legal hold notice. In one embodiment, the hold notifier 205 obtains identification information 260 and email data 265 to send to the confirmation module 230. The email data 265 can include a unique URL for each recipient. In one embodiment, the hold notifier 205 may receive a confirmation from confirmation module 230 in response to sending the legal hold information.

The email generator 210 can generate and send (via a mail server, not shown) a unique email to each recipient of the legal hold notice. In one embodiment, the email generated by the email generator 210 can inform a recipient that the recipient is required to comply with a legal hold notice. In an alternate embodiment, the email generated by the email generator 210 can inform a recipient that the recipient is released from a legal hold notice. The email generator 210 can generate a unique URL for each recipient required to comply with a legal hold notice and store the URL in email data 265. The unique URL generated for a recipient can include an identifier to identify the recipient of the URL (e.g., recipient identifier or a message identifier corresponding to the recipient) and a hold notice identifier to identify the legal hold notice that the recipient is required to comply with. In one embodiment, the body of text for each unique email is the same, except for a name of the recipient and the unique URL for the recipient. An example of the unique email generated by the email generator 210 is described in greater detail below in conjunction with FIG. 5, according to some embodiments.

The confirmation obtainer 215 can obtain a confirmation of compliance associated with a recipient from the confirmation module 230. In one embodiment, the confirmation of compliance is obtained by automatically receiving the confirmation of compliance from the confirmation module 230. In an alternate embodiment, the confirmation obtainer 215 determines whether one or more confirmations of compliance are stored in the staging area 250 in the confirmation module 230 at a predefined time (e.g., every 5 minutes). If the confirmation obtainer 215 determines that one or more confirmations of compliance are stored in the staging area 250, the confirmation obtainer 215 generates and sends a request (e.g., SOAP request) to the confirmation module 230 requesting the one or more confirmations of compliance in the staging area 250. The confirmation obtainer 215 can store the one or more confirmations of compliance in compliance data 270. In one embodiment, the confirmations of compliance may comprise answers to questions submitted by the recipient.

The secure information generator 220 can generate secure information from one or more confirmations of compliance stored in compliance data 270. For example, the secure information can include the legal hold notices (e.g., identifiers) currently managed by an administrator, a date and/or time indicating when each legal hold notice was sent, a list of recipients that have viewed the legal hold notice, a list of recipients that have replied to the legal hold notice, survey responses, etc. In some embodiments, the secure information can include visual representations of data, such as histograms of how many recipients responded to a legal hold notice in a particular way. Examples of visual representations and the secure information generated by secure information generator 220 are described in greater detail below in conjunction with FIGS. 7A and 7B, according to some embodiments.

The legal hold receiver 235 can receive legal hold information from the secure administration module 200. In one embodiment, the legal hold receiver 235 can generate and send an acknowledgement to confirm receipt of the legal hold information to the secure administration module 200. In one embodiment, the legal hold information can include information (e.g., name, contact information, unique message identifier for each recipient of the legal hold notice, legal hold notice identifier) for recipients required to comply with a legal hold notice. The legal hold receiver 235 may store the legal hold information in storage (not shown).

The URL verifier 240 can verify whether a URL corresponding to a webpage to display is valid. The verification may be performed in response to clicking of a URL by a recipient in an email generated by the secure administration module 200. In one embodiment, the URL can include a unique message identifier for the recipient and a hold notice identifier. The URL verifier 240 can compare the unique message identifier and the hold notice identifier to the legal hold information received by the legal hold receiver 235. If the unique message identifier in the URL matches a unique message identifier received by the legal hold receiver 235 and if the hold notice identifier in the URL matches a legal hold identifier received by the legal hold receiver 235, the URL verifier 240 can determine that the URL is valid. In one embodiment, if the URL verifier 240 determines that the URL is valid, the URL verifier 240 can send the URL to a web server (not shown) to display the webpage corresponding to the URL. In an alternate embodiment, if the URL verifier 240 determines that the URL is valid, the URL verifier 240 can display a webpage corresponding to the URL. An example of a webpage corresponding to a unique URL is described in greater detail below in conjunction with FIG. 6, according to some embodiments.

If the unique message identifier in the URL does not match a unique message identifier received by the legal hold receiver 235 or if the hold notice identifier in the URL does not match a legal hold identifier received by the legal hold receiver 235, the URL verifier 240 can determine that the URL is not valid. In one embodiment, if the URL verifier 240 determines the URL is not valid, the URL verifier 240 may send an error message to a client machine (not shown) corresponding to the recipient that clicked on the URL. In an alternate embodiment, if the URL verifier 240 determines the URL is not valid, the URL verifier 240 may not send an error message, and the URL may not load.

The confirmation receiver 245 can receive a confirmation of compliance from a recipient that indicates that the recipient is going to comply with a legal hold notice. The confirmation receiver 245 may use the legal hold information received by the legal hold receiver 235 to determine whether the confirmation of compliance is valid. In one embodiment, the confirmation receiver 245 may check that the recipient is a valid recipient by comparing an identification of the recipient received with the confirmation of compliance to identifiers in the legal hold information received by the legal hold receiver 235.

In one embodiment, if the confirmation of compliance is valid, the confirmation receiver 245 can store the confirmation of compliance in the staging area 250. In an alternate embodiment, if the confirmation of compliance is valid, the confirmation receiver 245 can send the confirmation to the secure administration module 200. In one embodiment, if the confirmation of compliance is not valid, the confirmation receiver 245 sends an error message to a client machine (not shown) from which the confirmation of compliance came. In an alternate embodiment, if the confirmation of compliance is not valid, the confirmation receiver 245 does not store the confirmation of compliance in the staging area 250.

Figure 3:
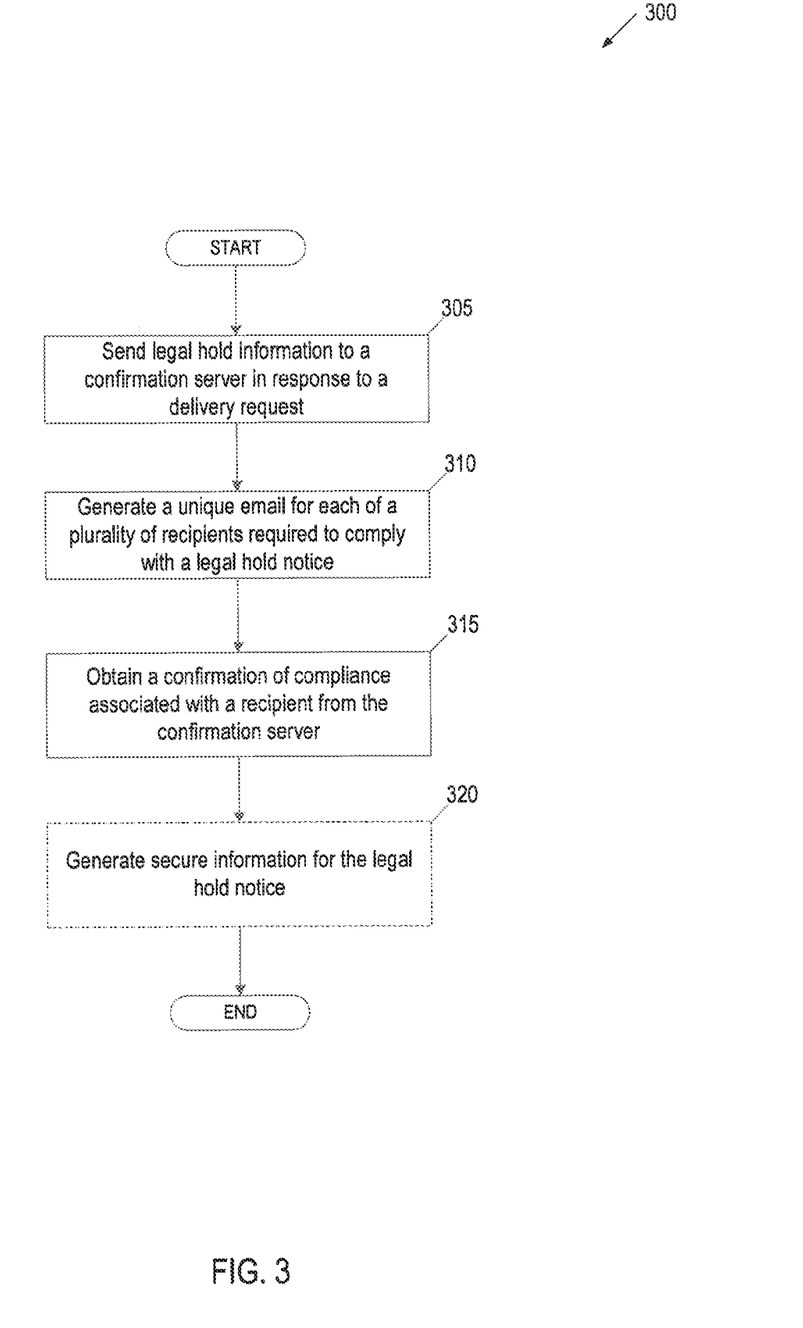
FIG. 3 is a flow diagram illustrating an embodiment for a method of managing legal hold notices, in accordance with an embodiment.

FIG. 3 is a flow diagram of an embodiment of a method 300 for managing legal hold notices by a secure administration server. The method 300 is performed by processing logic that may comprise hardware (circuitry, dedicated logic, etc.), software (such as is run on a general purpose computer system or a dedicated machine), or a combination of both. In one embodiment, the method 300 is performed by the secure administration server 110 of FIG. 1. The method 300 may be performed by a secure administration module 120 running on secure administration server 110 or another machine.

At block 305, processing logic sends legal hold information to a confirmation server in response to a delivery request. In one embodiment, the delivery request is made by an administrator that would like to distribute a legal hold notice. The legal hold information can include the minimum amount of information in order to allow a recipient to respond to the legal hold notice. In one embodiment, the legal hold information includes an identifier for each recipient that needs to be notified of a legal hold notice. In one embodiment, the legal hold information includes an identifier of the legal hold notice (e.g., a name of the legal hold notice, such as "Company A vs. Company B", a numeric identifier, etc.). In one embodiment, the legal hold information includes one or more questions and possible answers to present to a recipient on a webpage. In one embodiment, the legal hold information is sent using a protocol specification protocol (e.g., SOAP, XMLRPC, etc.) that is usable over any transport (e.g., http, https, etc.). In one embodiment, processing logic receives an acknowledgment that the legal hold information was received by the confirmation server. In an alternate embodiment, no acknowledgement is required or received.

At block 310, processing logic generates a unique email for each of a plurality of recipients required to comply with a legal hold notice. In one embodiment, the email informs each recipient that the recipient is required to comply with a legal hold notice. In an alternate embodiment, the email informs a recipient that the recipient is released from a legal hold notice and no longer has to comply with the legal hold notice.

In one embodiment, the unique email includes the name of the recipient, a body of text, and a URL that is unique to the recipient. The body of text can be the same for each recipient, and may be provided by the administrator of the legal hold notice. The unique URL can include a message identifier (e.g., 128 bits) to identify the recipient of the URL and a hold notice identifier to identify the legal hold notice that the recipient is required to comply with. In one embodiment, the message identifier is the same as an identifier of the recipient. In an alternate embodiment, the message identifier is different than an identifier of the recipient. In one embodiment, the message identifier is randomly generated for each recipient using a random number generator. In an alternate embodiment, the message identifier is created by the administrator of the legal hold notice. The hold notice identifier can be a unique identifier for the legal hold notice. In one embodiment, the hold notice identifier is randomly generated for each legal hold notice using a random number generator. In an alternate embodiment, the hold notice identifier is created by the administrator of the legal hold notice. An example of the unique email is described in greater detail below in conjunction with FIG. 5, according to some embodiments. The unique URL represents a webpage that is specific to the recipient, and can include information for the recipient on how to comply with a legal hold notice or how to be released from a legal hold notice. An example of a webpage corresponding to a unique URL is described in greater detail below in conjunction with FIG. 6, according to some embodiments.

At block 315, processing logic obtains a confirmation of compliance associated with a recipient from the confirmation server. In some embodiments, the confirmation of compliance is obtained at a predefined time (e.g., every 5 minutes, at midnight every night, etc.) In one embodiment, the confirmation of compliance is obtained by receiving the confirmation of compliance from the confirmation server automatically. In this embodiment, the confirmation server sends a confirmation of compliance upon receiving the confirmation of compliance from a recipient.

In an alternate embodiment, the confirmation of compliance is obtained by determining whether one or more confirmations of compliance are stored in a staging area in the confirmation server. The processing logic may make this determination by sending a request (e.g., SOAP request) to the confirmation server requesting information about the staging area from the confirmation server. If the confirmation server sends back information indicating that there are one or more confirmations of compliance in the staging area, the processing logic can determine that one or more confirmations of compliance are stored in the staging area. If the processing logic determines that one or more confirmations of compliance are stored in the staging area, the processing logic can send a request (e.g., SOAP request) requesting the one or conformations of compliance from the confirmation server. If the confirmation server sends back information indicating that there is no confirmation of compliance in the staging area, the processing logic may generate another request (e.g., SOAP request) to the confirmation server in a predefined amount of time (e.g., 5 minutes). In one embodiment, the confirmation of compliance includes information about the recipient, such as a name of the recipient, an identifier for the recipient, a message identifier for the recipient, or another identifier to identify the recipient. In one embodiment, the confirmation of compliance includes answers to questions submitted by the recipient.

At optional block 320, processing logic can generate secure information from one or more confirmations of compliance. In one embodiment, the secure information is generated by parsing the received confirmation of compliance. In an alternate embodiment, the secure information is generated by processing the received confirmation of compliance. An identifier of the recipient can be obtained from the confirmation of compliance by the parsing, and information related to that recipient can be updated. For example, the secure information may have previously indicated that recipient A had been sent the legal hold notice on Jan. 1, 2012 at 12:00 PM EST. Once the confirmation of compliance has been received for recipient A, the secure information is updated (written) to include that the recipient has sent back a confirmation of compliance. A date and time when the confirmation of compliance was sent and/or received may further be stored in the secure information. For example, upon receiving a confirmation of compliance from recipient A, the secure information may indicate that recipient A has sent a confirmation of compliance on Jan. 2, 2012 at 6:00 AM EST. The secure information can further be generated to include histograms or other visual representations for an administrator to easily view legal hold notices and information corresponding to each legal hold notice. For example, the secure information can include the legal hold notices (e.g., identifiers) currently managed by an administrator, a date and/or time indicating when each legal hold notice was sent to each recipient, a list of recipients that have viewed the legal hold notice, a list of recipients that have replied to the legal hold notice, survey responses, etc. Examples of visual representations and the secure information are described in greater detail below in conjunction with FIGS. 7A and 7B, according to some embodiments.

Figure 4:
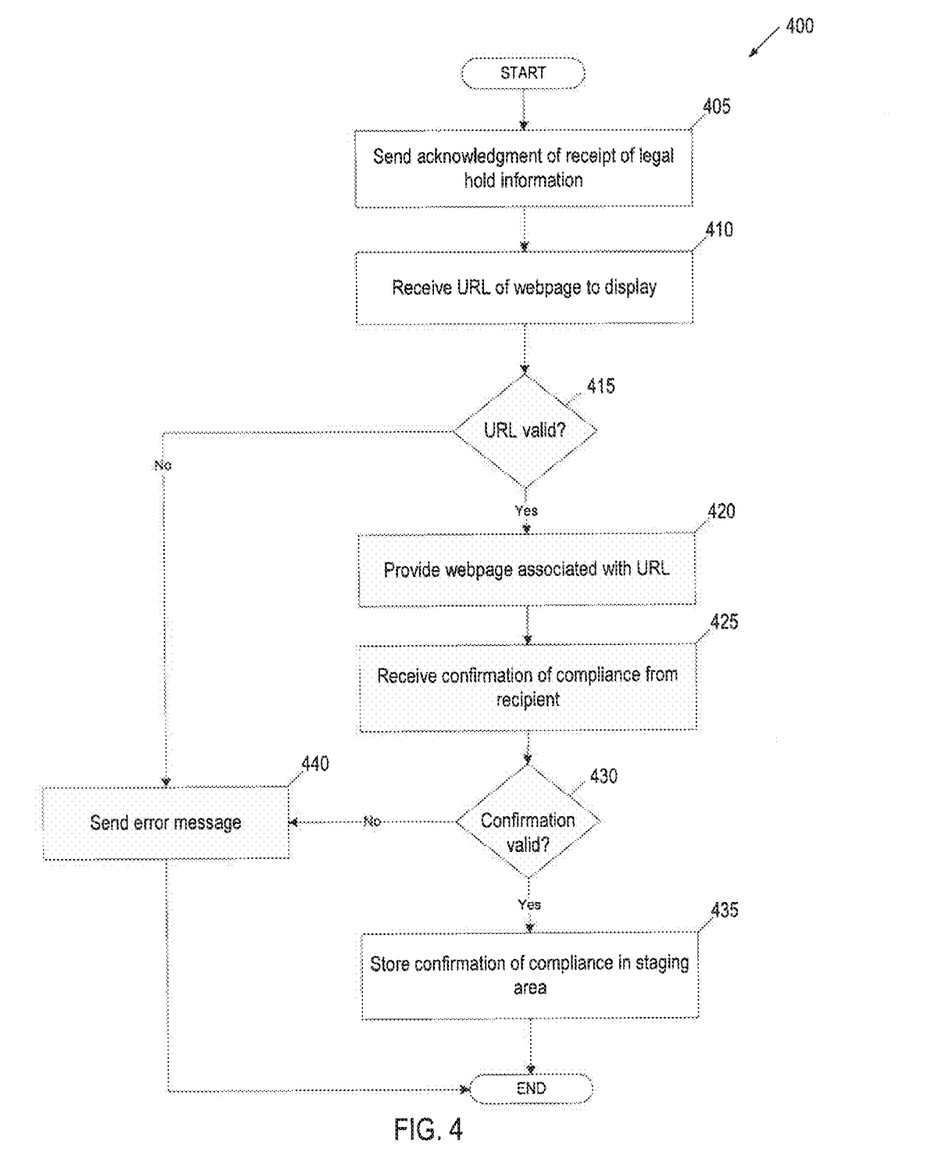
FIG. 4 is a flow diagram illustrating an embodiment for responding to legal hold notices, in accordance with an embodiment.

FIG. 4 is a flow diagram of an embodiment of a method 400 for managing legal hold notices by a confirmation server. The method 400 is performed by processing logic that may comprise hardware (circuitry, dedicated logic, etc.), software (such as is run on a general purpose computer system or a dedicated machine), or a combination of both. In one embodiment, the method 400 is performed by the confirmation server 150 of FIG. 1. The method 400 may be performed by a confirmation module 160 and web server 170 running on secure administration server 110 or another machine.

At block 405, processing logic can generate and send an acknowledgement to confirm receipt of legal hold information received from a secure administration server. The legal hold information can include information (e.g., name, contact information, unique message identifier for each recipient of the legal hold notice, legal hold notice identifier) for recipients required to comply with a legal hold notice. Processing logic may store the legal hold information received from the secure administration server after sending the acknowledgement.

At block 410, processing logic receives a URL of a webpage to display. The URL of the webpage can be received from a client machine of a recipient of a legal hold notice when the recipient clicks on the URL in an email.

At block 415, processing logic can verify whether the URL corresponding to the webpage to display is valid. The URL can include a unique message identifier for the recipient and a hold notice identifier. Processing logic can verify the URL by comparing a unique message identifier and a hold notice identifier in the URL to legal hold information received from the secure administration server. If the unique message identifier in the URL does not match a unique message identifier received from the secure administration server or if the hold notice identifier in the URL does not match a legal hold identifier from the secure administration server, the processing logic can determine that the URL is not valid. If the URL is not valid, the method 400 proceeds to block 435. If the unique message identifier in the URL matches a unique message identifier from the secure administration server and if the hold notice identifier in the URL matches a legal hold identifier from the secure administration server, the processing logic can determine that the URL is valid. If the URL is valid, the method 400 proceeds to block 420.

At block 420, processing logic provides the webpage associated with the valid URL to a client device of the recipient. In some embodiments, the webpage includes information about the legal hold notice that is specific to the recipient of the legal hold notice based on the unique message identifier for the recipient. For example, the webpage can include the recipient's name, the name of each legal hold notice that the recipient has been notified of, survey questions for the recipient to answer, and a manner for the user to confirm compliance with the legal hold notice (e.g., a button that the recipient can click to confirm compliance with the legal hold notice). An example of a webpage corresponding to a valid URL is described in greater detail below in conjunction with FIG. 7, according to some embodiments.

At block 425, processing logic receives a confirmation of compliance from a recipient that indicates that the recipient is going to comply with a legal hold notice. The confirmation of compliance may include an identifier of the recipient, an identifier of the legal hold notice to which the recipient is confirming compliance, as well as answers to survey questions answered by the recipient.

At block 430, processing logic determines whether the confirmation of compliance received from the user is valid. To determine whether the confirmation of compliance is valid, processing logic may check that the recipient is a valid recipient by comparing an identification of the recipient received with the confirmation of compliance to identifiers in the legal hold information received from the secure administration server. In one embodiment, if the confirmation of compliance is not valid, the method 400 proceeds to block 440. In one embodiment, if the confirmation of compliance is valid, the method 400 proceeds to block 435.

At block 435, processing logic can store the confirmation of compliance in a staging area. The staging area may be provided by the confirmation server in order to minimize the amount of resources required by the processing logic. By storing the confirmation of compliance in a staging area, the processing logic does not have to send a confirmation of compliance each time a confirmation of compliance is received. Instead, processing logic can send the confirmations of compliance at a predefined time (e.g., every 5 minutes, at a predefined time of day, etc.) or processing logic in another server (e.g., secure administration server) can request the confirmations of compliance stored in the staging area at a predefined time (e.g., every 5 minutes, at a predefined time, etc.).

At block 440, processing logic can send an error message to a client machine from which the confirmation of compliance was received. In one embodiment, the error message can include the reason for the error (e.g., "invalid URL," "invalid recipient," etc). In an alternate embodiment, the error message does not include the reason for the error.

Figure 5:
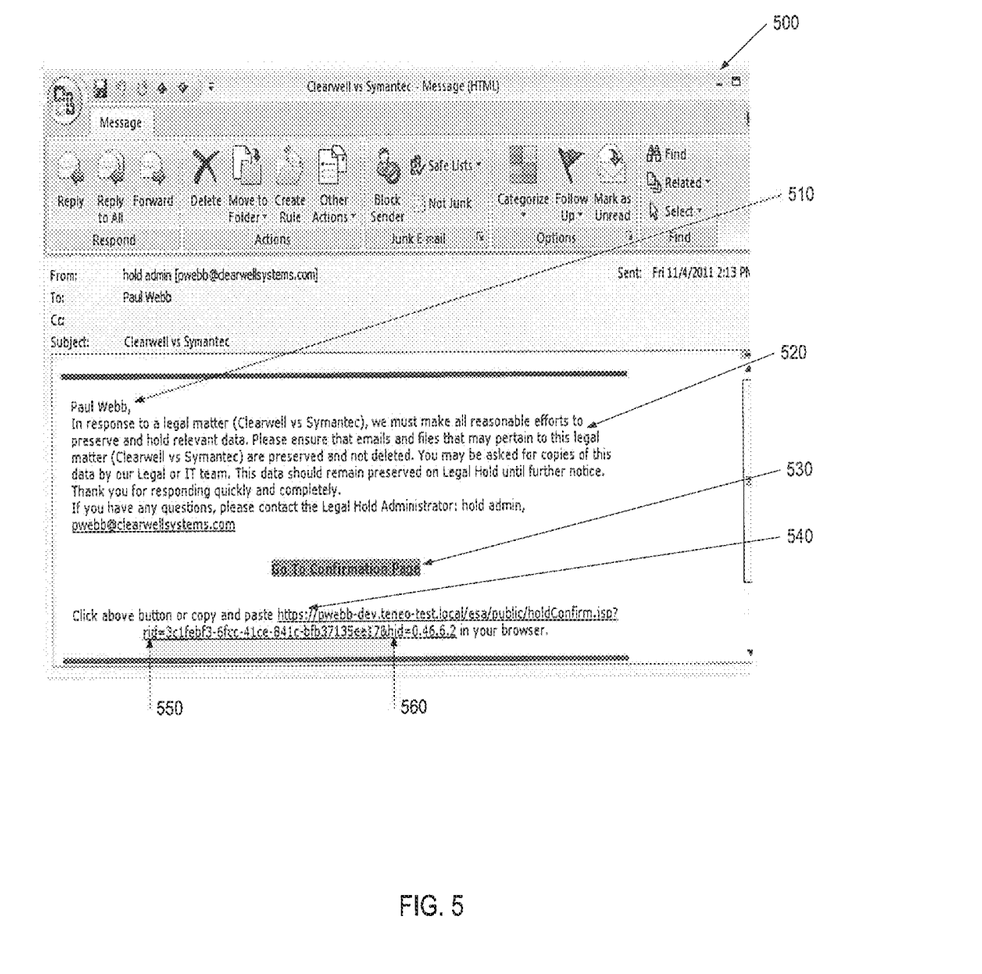
FIG. 5 is an exemplary email generated by a secure administration server, according to some embodiments.

FIG. 5 is an exemplary unique email 500 generated for a recipient required to comply with a legal hold notice. In one embodiment, the unique email 500 includes the name of the recipient 510.

In one embodiment, the unique email 500 includes a body of text 520. In one embodiment, the body of text 520 may include a name of the legal hold notice, such as "Clearwell vs Symantec" in unique email 500. In one embodiment, the body of text 520 informs the recipient that the recipient is required to comply with a legal hold notice, and can inform the user of one or more actions that the recipient is required to take. In unique email 500, the body of text 520 states to "Please ensure that emails and files that may pertain to this legal matter (Clearwell vs Symantec) are preserved and not deleted." In an alternate embodiment, the body of text 520 informs the recipient that the recipient is released from a legal hold. The body of text 520 can include the name of an administrator of the legal hold notice and contact information for the administrator, such as "Legal Hold Administrator: hold admin, pwebb@clearwellsystems.com."

In one embodiment, the unique email 500 includes a visual representation of a URL 530 and/or a URL 540 corresponding to a unique webpage for the recipient. The unique URL 540 can include a message identifier 550 to identify the recipient of the URL 540 and a hold notice identifier 560 to identify the legal hold notice that the recipient is required to comply with.

Figure 6:
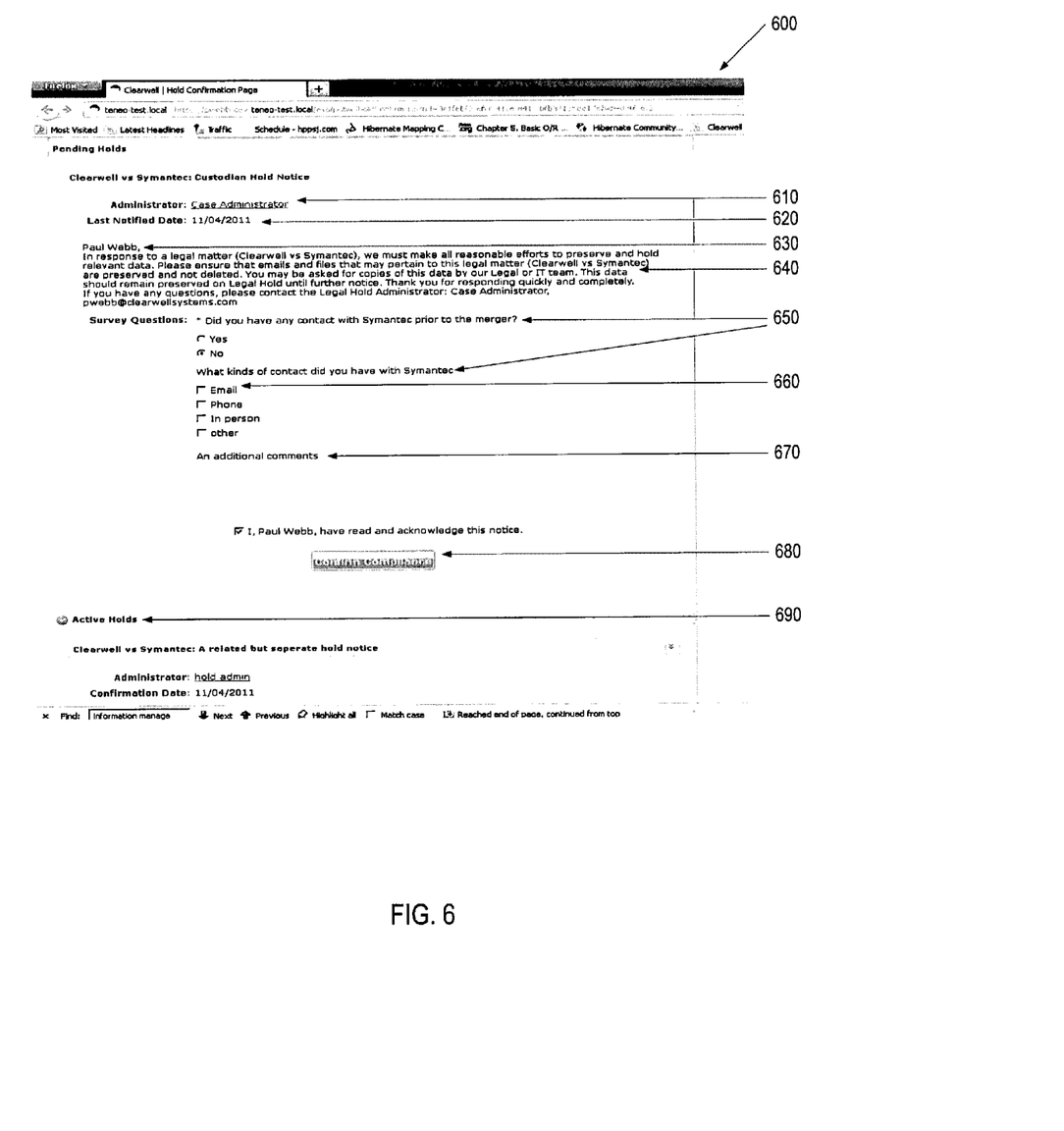
FIG. 6 is an exemplary webpage presenting legal hold information for a recipient, according to some embodiments.

FIG. 6 is an exemplary webpage 600 specific to a recipient that is required to comply with a legal hold notice. In one embodiment, the webpage 600 is displayed in response to a recipient clicking on a URL in an email specific to the recipient.

The webpage 600 can include an administrator 610 of the legal hold notice, a date 620 that the recipient was last notified of the hold, the name 630 of the recipient, and a body of text 640. Upon clicking on the administrator 610, an email program may open a new message such that the recipient can email the administrator 610. The body of text 640 may inform the recipient that the recipient is required to comply with a legal hold notice, and may inform the user of one or more actions that the recipient is required to take. The webpage 600 may further include one or more survey questions 650 for the recipient to answer. The survey questions may be created by the administrator 610 of the legal hold notice or may be created by another party. The webpage 600 may further include one or more answers 660 to each of the survey questions 650. An answer 660 to a survey question 650 may be selected or entered by a recipient via a radio button, option button, check box, drop down list, scroll bar, text box, or any other type of graphical user interface element presented on the webpage 600.

In one embodiment, the webpage 600 may further include an additional comments text box 670 where a recipient can enter comments for the administrator regarding the legal hold notice.

The webpage 600 can include a confirm compliance button 680 for the recipient to confirm receipt and compliance with the legal hold notice. The confirm compliance button 680 can be any type of graphical user interface element. When a recipient clicks on the confirm compliance button 680, the administrator 610 is informed of the recipient's confirmation of compliance, and secure information is generated for the recipient. In one embodiment, the webpage 600 is closed once the recipient clicks on the confirm compliance button 680.

In one embodiment, the webpage 600 can list all active holds 690 that the user has received and/or confirmed compliance with, and can allow the recipient to view each of the legal hold notices associated with the recipient.

Figure 7A:
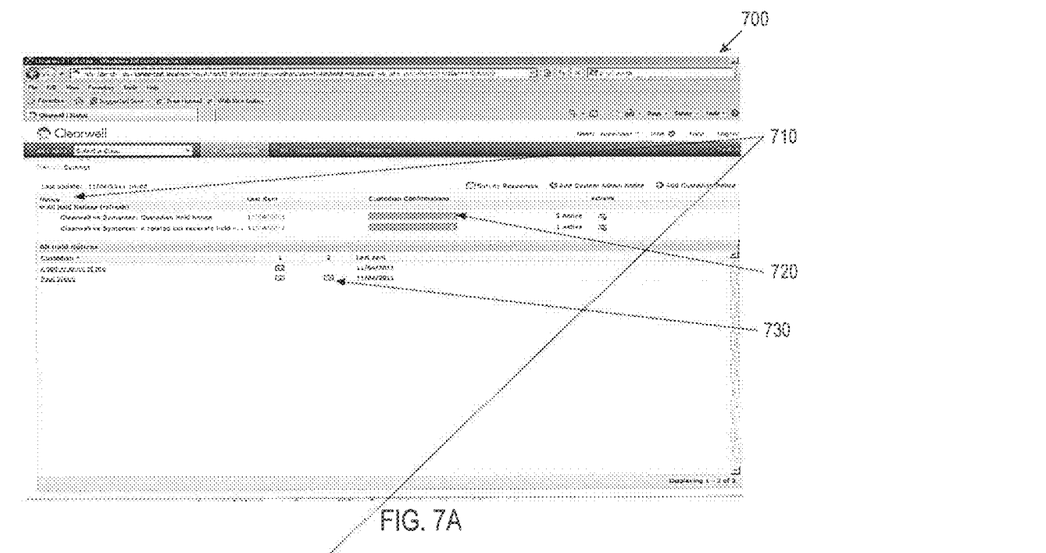
FIGS. 7A-7B are exemplary visual representations presenting secure information for a legal hold notice, according to some embodiments.
Figure 7B:
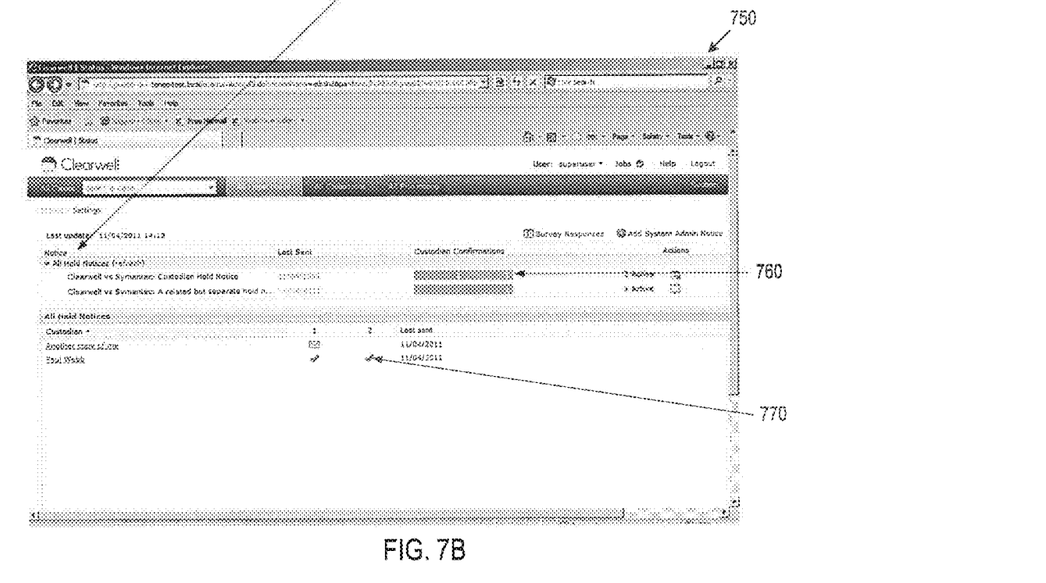

FIGS. 7A and 7B are visual representations 700 and 750 of secure information generated for one or more confirmations of compliance sent to a plurality of recipients. The visual representations 700 and 750 can be hosted on a secure administration server inside a firewall, such as secure administration server 110 of FIG. 1. In some embodiments, the visual representations 700 and 750 are only available to one or more administrators of a secure administration server.

Visual representations 700 and 750 can include notice information 710. The notice information 710 can include a list of all hold notices associated with an administrator. The notice information 710 can include the name of each legal hold notice sent out by the administrator and the date and/or time the notice was last sent. The notice information 710 can also include a visual representation of the number of confirmations of compliance sent and received for a legal hold notice. In the visual representation 700, a confirmation of compliance 720 illustrates that 2 notices have been sent out for a legal hold notice, and that no confirmations of compliance have been received. The confirmation of compliance 720 illustrates that no confirmations of compliance have been received using a predefined color. In visual representation 750, which represents an updated version of the visual representation 700 (a later point in time), the confirmation of compliance 760 illustrates that 2 notices have been sent out for a legal hold notice, that one confirmation of compliance has been received, and that one confirmation of compliance has not been received. The confirmation of compliance 760 illustrates that one confirmation of compliance has been received by updating the color of a portion of the confirmation of compliance 760 (one half of the color bar is a color representing that a confirmation of compliance has been received and the other half of the color bar is a color representing that a confirmation of compliance has not been received, which is the same color as the color of confirmation of compliance 720).

The visual representations 700 and 750 can further include the email information 730 and 770, respectively. The email information 730 and 760 can present information to an administrator about whether an email has been sent to a recipient of a legal hold notice. For example, the email information 730 illustrates that an email for legal hold notice 1 and legal hold notice 2 was last sent to a recipient, Paul Webb, on Nov. 4, 2011 (illustrated by an envelope). When the visual representation 700 is updated, as represented by the visual representation 750, the email information 770 illustrates that the recipient, Paul Webb, viewed and confirmed compliance with both legal hold notice 1 and legal hold notice 2 (illustrated by a checkmark).

Visual representations 700 and 750 can further include other visual representations for an administrator to easily view legal hold notices and information corresponding to each legal hold notice for a large number of recipients.

Figure 8:
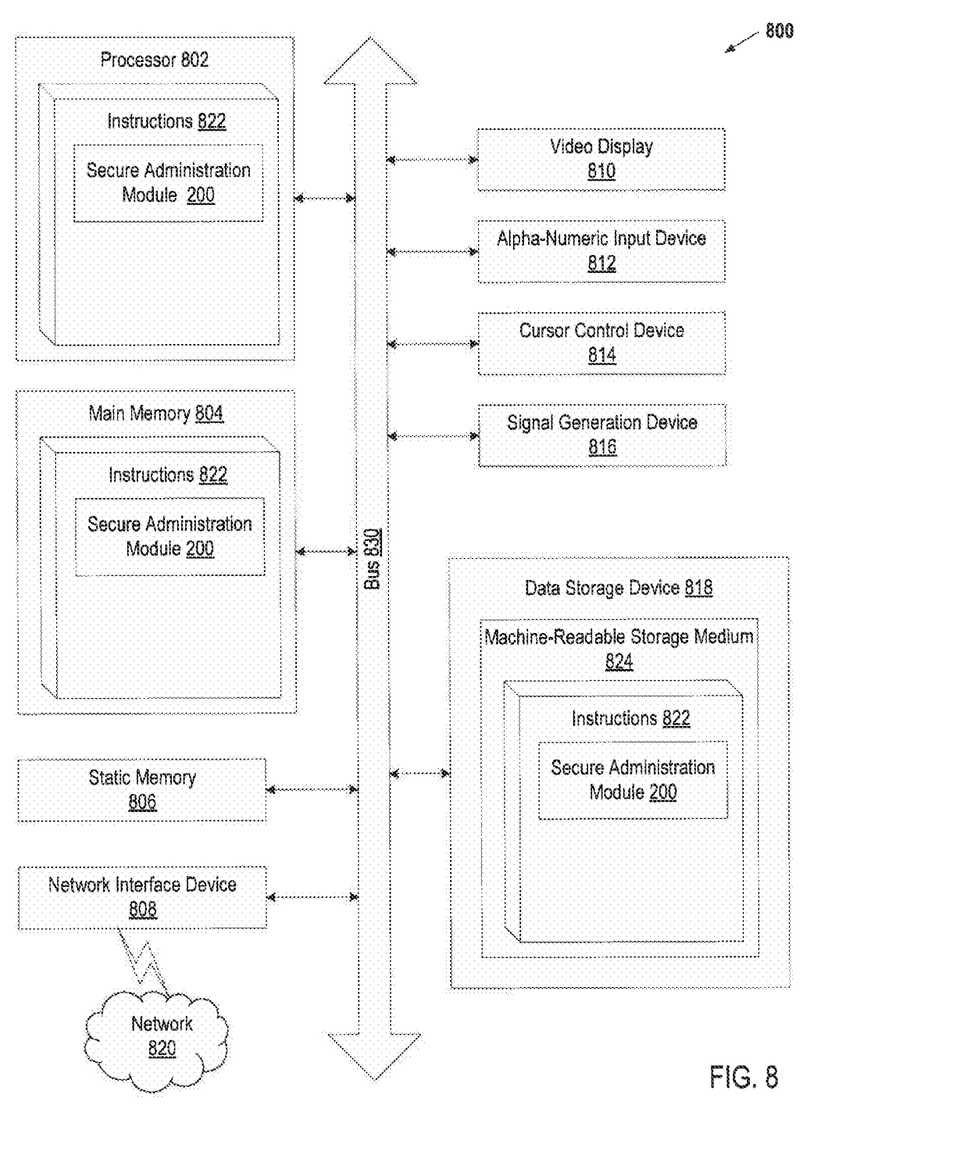
FIG. 8 is a block diagram of an exemplary computer system that may perform one or more of the operations described herein.

FIG. 8 illustrates a diagram of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 824 on which is stored one or more sets of instructions 822 (e.g., software) embodying any one or more of the methodologies or functions described herein. The instructions 822 may also reside, completely or at least partially, within the main memory 804 and/or within the processor 802 during execution thereof by the computer system 800, the main memory 804 and the processor 802 also constituting computer-readable storage media. The instructions 822 may further be transmitted or received over a network 820 via the network interface device 808.

In one embodiment, the instructions 822 include instructions for a secure administration module (e.g., secure administration module 200 of FIG. 2) and/or a software library containing methods that call a secure administration module. In one embodiment, the instructions 822 include instructions for a confirmation module (e.g., confirmation module 230 of FIG. 2) and/or a software library containing methods that call a confirmation module. While the computer-readable storage medium 824 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a server computing system programmed to perform the following, comprising:
   in response to a delivery request, sending, by a processing device of a secure administration server, legal hold information to a confirmation server, the legal hold information comprising a plurality of recipients required to comply with a legal hold notice;
   generating, by the processing device of the secure administration server, a unique email for each of the plurality of recipients required to comply with the legal hold notice, each unique email comprising a unique Uniform Resource Locator (URL) to the confirmation server for a corresponding recipient, wherein the unique URL for each recipient comprises a unique message identifier for the recipient and a hold notice identifier, the hold notice identifier identifying the legal hold notice associated with the URL;
   verifying, by the confirmation server, verify whether the URL is valid by verifying the unique message identifier and the hold notice identifier; and
   obtaining, if the URL is valid, by the secure administration server, a confirmation of compliance associated with the corresponding recipient from the confirmation server.

2. The method of claim 1, wherein the secure administration server is a secure server and the confirmation server is an insecure server.

3. The method of claim 1, wherein obtaining the confirmation of compliance comprises:
at a predefined time, determining, by the secure administration server, whether a confirmation is stored in a staging area of the confirmation server, wherein each confirmation received by the confirmation server is stored in the staging area; and
sending a request, by the secure administration server, to the confirmation server upon determining that the confirmation is stored in the staging area of the confirmation server.

4. The method of claim 1, further comprising:
generating, by the secure administration server, secure information for the legal hold notice based on the obtained confirmation.

5. The method of claim 1, further comprising:
generating, by the secure administration server, a release for the legal hold notice, the release comprising a release email for each of the plurality of recipients.

6. The method of claim 1, further comprising:
in response to receiving a request from a recipient to load the unique URL corresponding to the recipient, displaying, by the confirmation server, a webpage associated with the unique URL, wherein the webpage comprises each legal hold corresponding to the recipient.

7. The method of claim 6, wherein the webpage further comprises a question for the recipient and an interface for the recipient to submit an answer to the question.

8. A system comprising:
a secure administration server comprising a memory and a processing device coupled with the memory, the secure administration server configured to:
in response to a delivery request, send legal hold information to a confirmation server over a secure connection, the legal hold information comprising a plurality of recipients required to comply with a legal hold notice;
generate a unique email for each of the plurality of recipients, each unique email comprising a unique Uniform Resource Locator (URL) to the confirmation server for a corresponding recipient, wherein the unique URL for each recipient comprises a unique message identifier for the recipient and a hold notice identifier, the hold notice identifier identifying the legal hold notice associated with the URL; and
obtain, if the URL is valid, a confirmation of compliance associated with the corresponding recipient from the confirmation server; and
a confirmation server comprising a memory and a processing device coupled with the memory, the confirmation server configured to:
verify whether the URL is valid by verifying the unique message identifier and the hold notice identifier.

9. The system of claim 8, wherein to obtain the confirmation of compliance, the secure administration server is configured to:
at a predefined time, determine whether a confirmation is stored in a staging area of the confirmation server; and
send a request to the confirmation upon determining that the confirmation is stored in the staging area of the confirmation server.

10. The system of claim 8, wherein the secure administration server is further configured to:
generate secure information for the legal hold notice based on the obtained confirmation.

11. The system of claim 8, wherein the secure administration server is further configured to:
generate a release for the legal hold notice, the release comprising a release email for each of the plurality of recipients.

12. The system of claim 8, wherein the confirmation server is further configured to:
in response to receiving a request from a recipient to load the unique URL corresponding to the recipient, display a webpage associated with the unique URL, wherein the webpage comprises each legal hold corresponding to the recipient.

13. A non-transitory computer readable storage medium including instructions that, when executed by a processor, cause the processor to:
in response to a delivery request, send legal hold information to a confirmation server, the legal hold information comprising a plurality of recipients required to comply with a legal hold notice;
generate a unique email for each of the plurality of recipients required to comply with the legal hold notice, each unique email comprising a unique Uniform Resource Locator (URL) to the confirmation server for a corresponding recipient, wherein the unique URL for each recipient comprises a unique message identifier for the recipient and a hold notice identifier, the hold notice identifier identifying the legal hold notice associated with the URL;
verify whether the URL is valid by verifying the unique message identifier and the hold notice identifier; and
obtain, if the URL is valid, a confirmation of compliance associated with the corresponding recipient from the confirmation server.

14. The non-transitory computer readable storage medium of claim 13, obtaining the confirmation of compliance comprises:
at a predefined time, determine whether a confirmation is stored in a staging area of the confirmation server, wherein each confirmation received by the confirmation server is stored in the staging area;
send a request to the confirmation server for the confirmation upon determining that the confirmation is stored in the staging area of the confirmation server; and
generate secure information for the legal hold notice based on a confirmation received from the confirmation server.

15. The non-transitory computer readable storage medium of claim 13, the processor further to:
generate a release for the legal hold notice, the release comprising a release email for each of the plurality of recipients.

16. The non-transitory computer readable storage medium of claim 13, wherein the URL is associated with a webpage, wherein the webpage comprises each legal hold corresponding to a recipient.

17. The non-transitory computer readable storage medium of claim 16, wherein the webpage further comprises a question for the recipient and an interface for the recipient to submit an answer to the question.

* * * * *